Aug. 1, 1939.   V. PETERSEN   2,167,677
REDUCTION DRIVE FOR VARIABLE CONDENSERS
Filed July 9, 1934   2 Sheets-Sheet 2
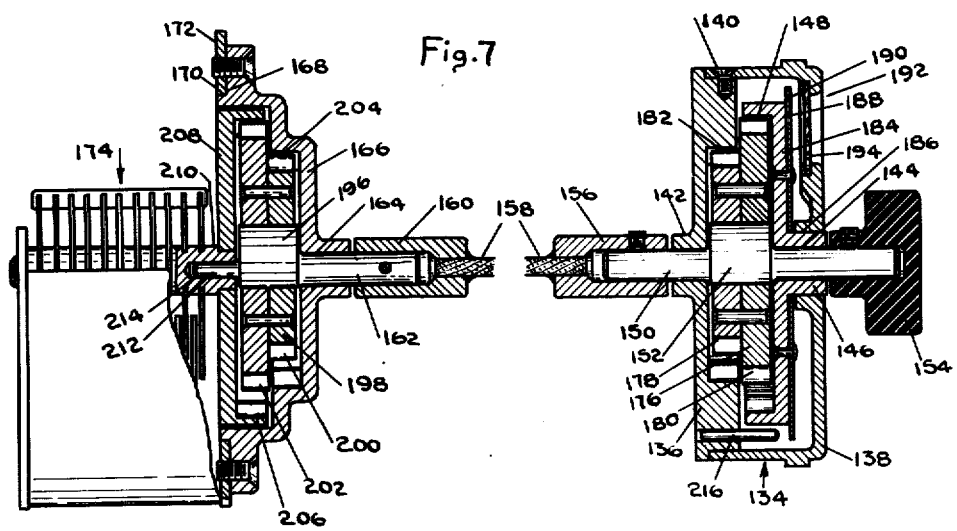
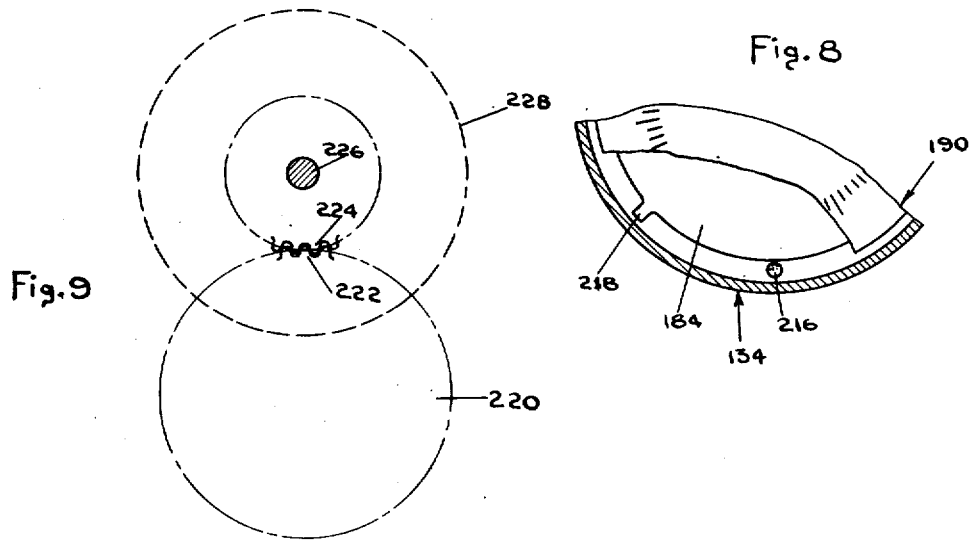
INVENTOR
VALENTIN PETERSEN
BY Henry L. Burkitt
ATTORNEY Patented Aug. 1, 1939

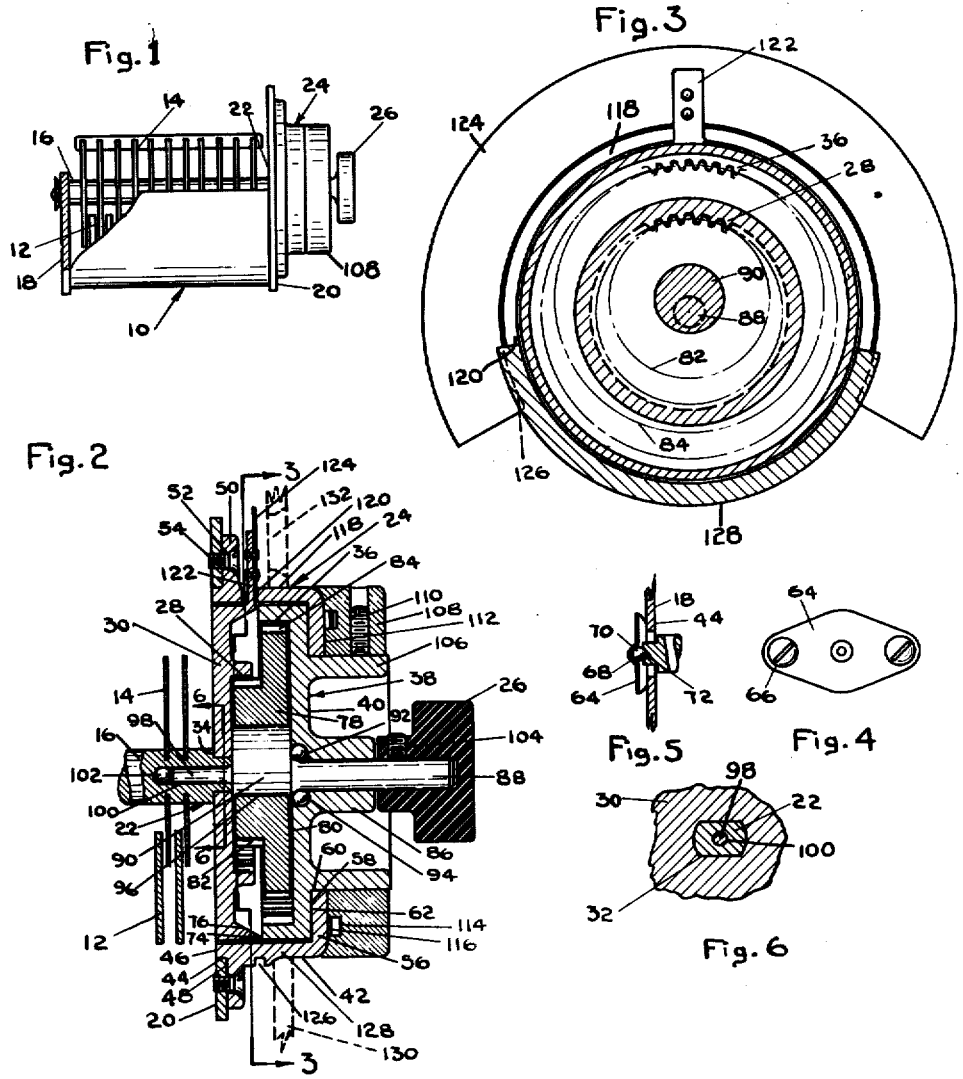

2,167,677

UNITED STATES PATENT OFFICE 2,167,677

REDUCTION DRIVE FOR VARIABLE CONDENSERS

Valentin Petersen, West New Brighton, N. Y.

Application July 9, 1934, Serial No. 734,423

17 Claims. (Cl. 74—10)

This invention relates to reduction drives for variable condensers.

The invention has peculiar adaptability for application in variable condensers for radio sets. Especially with the high degree of accuracy sought with the increased popularity of so-called "short-wave" radio broadcasting and reception, many attempts have been made to secure a high degree of reduction between the manipulating knob fingered by the one adjusting the apparatus to a desired wave-length and the shaft of such element as the rotor of a variable condenser, by which "tuning" may, either in whole or in part, be carried out. Such attempts have generally followed the usual trend of larger and longer gear trains, or the use of gears so large in diameter that special fittings are necessary properly to associate all the elements in position to effect the desired reduction.

The simple reduction obtained from a usual gear train, requiring, as it does, special mountings upon the condenser, introduces space problems of an undesirable character. The present-day trend is toward decreasing, to as large a degree as possible, the extent of each element, as, for instance, where radio-receiving apparatus is installed in automobiles. In such situations, space is at a premium. There the ordinary gear train, because of its great bulk and complexity of parts, becomes an inefficient and undesirable means for the purpose indicated.

One of the many problems thus met in providing a suitable drive for a micrometric adjustment of the variable element has been to accomplish this result while assuring against slippage between the parts of the driving mechanism, as, for instance, by utilizing the positive non-slipping functions of gears.

Many of the designed drives mentioned have mountings requisite therefor which entail a large number of parts, in addition to the details of construction and of the many parts of the drive itself. The elimination or reduction of such large numbers of parts likewise becomes a much-sought-for end.

In the case of the plate condenser most commonly used at the present time, the roto plates are designed to produce the so-called "straight-line" effect, where, of course, the plates are eccentrically mounted upon their shaft. In such case, there is desired a reduction system which would make possible the use of the same end plates for the condenser no matter what the direction of rotation of such plates might be.

Another type of reducing mechanism used requires friction surfaces for the reducing function. Such construction, however, is practically defective and undesirable as substantial slippage between the parts of the mechanism may and does occur. When any degree of resistance is encountered, this slippage will become appreciably noticeable, and will distort, for the operator, the entire arrangement of the apparatus. Where such mechanism is interposed beyond the dial in the drive for a cable, as, for instance, in connection with remote control for radio-receiving apparatus carried by automobiles, as above mentioned, no prediction can be made concerning the divergence between successive readings of the dial and, therefore, its elimination as a guide of any worth-while character.

It is an object of the invention to provide a gear drive adapted for use in connection with condensers of the variable type, where such drive is capable of effecting a very high degree of reduction, even though the parts are contained within but a small portion of the space requisite for ordinary gear drives. As a feature of such drive is the fact that no greater space requirement, radially away from the condenser shaft, is involved than that set up by the rotating plates themselves. Thus, where such a drive is introduced, no enlargements or similar distortions of the casing or cabinet are involved. Thus, the extent of the elements necessary for such drive may be even less than the extent of the rotor plates themselves.

It is an object of the invention to provide, in a gear drive of the type indicated, mechanism whereby a coarse adjustment or micrometer adjustment may be obtained at will, all while using substantially the same elements, and both the micrometer adjustment and the coarse adjustment being obtained positively, as by a positively geared drive, without opportunity for slippage.

It is an object of the invention to provide a reduction drive, especially adapted for accurately adjusting the rotors of variable condensers, which embodies in itself elements capable of completely housing, out of sight, moving parts of the drive, and thus also guarding such members against foreign particles which might interfere with the proper operation of the apparatus. Since the drive, in one of its specific phases, is designed to utilize annular gears in a novel manner, these gears may be disposed in opposed relationship to each other, thus forming a chamber not open to entry of such particles. At the same time, such opposed members may constitute contact surfaces imparting to the apparatus sufficient friction to minimize, and even to eliminate, the effects of back-lash. Simultaneously, these contacted surfaces may serve as accurate stops for lining up the parts of the condenser.

In this relation, it is an object of the invention to provide a reduction gear drive, especially adaptable for variable condensers, the elements of which drive are capable of assembly by simple manipulations, without any great degree of technical skill, and with a small number of parts, so that, merely by bringing the several elements into a proper association, one with the other, the final apparatus is erected.

A multiplicity of stamping operations for the production of a low-priced article such as a condenser is, of course, undesirable. However, as the market, in connection with the "straight-line" plate condenser, requires the drive for the rotor to be clockwise or counterclockwise from minimum to maximum, for different designs of the radio-receiving or similar apparatus, there arise different specifications for the end plates of such condensers. In such end plates are provided the bearings for the rotor shafts. The position of such bearings, by the very construction of the rotor plates, cannot be centrally of the end plates. If, in addition, it is required that one of the end plates also provide a mounting for elements of the reduction drive, then the punching of the two end plates for the same condenser, or for two condensers wherein the plates rotate oppositely to obtain the same adjusted condition, cannot be the same. Therefore, for each distinct job lot, wherein differences of this character are to exist, it becomes requisite to provide many differently punched end plates.

It is an object of the invention to provide a reduction gear drive for plate condensers of the type indicated by means of which drive but a single mounting hole is required properly to assemble the entire drive mechanism on such end plates. Thus is made possible the interchangeable use of such plates, whether the rotor of the condenser is intended to rotate in one direction or another to obtain the same character of adjustment in the normal operation of the condenser.

It is an object of the invention to provide a reduction drive for condenser rotors which positively locks the rotor against rotation under force acting directly upon the rotor itself, and only permits rotation of such rotor upon application of a proper force to a manipulator provided especially for that purpose.

Other objects of this invention will hereinafter be set forth, or will be apparent from the description and the drawings, in which are illustrated certain embodiments of apparatus capable of demonstrating the invention.

The invention, however, is not intended to be restricted to any particular construction or arrangement of parts, or to any particular application of such construction, or to any specific manner of use, or to any of various details thereof herein shown and described, as the same may be modified in various particulars, or be applied in many varied relations, without departing from the spirit and scope of the claimed invention, the embodiments herein illustrated and described being merely to demonstrate certain of the principles of the invention by some of the possible forms and modifications in which physically the invention might be embodied.

On the drawings, in which the same reference characters refer to the same parts throughout, and in which are disclosed such demonstrative embodiments:

Fig. 1 is an elevational view, illustrating the application of features of the invention to a condenser assembly, parts being broken away;

Fig. 2 is a vertical sectional view, axially through an assembly similar to that shown in Fig. 1, to an enlarged scale, illustrating the construction of a gear drive embodying features of the invention, portions being shown in elevation, and parts being broken away;

Fig. 3 is a sectional view, taken vertically through Fig. 2, substantially on the line 3—3;

Fig. 4 is an elevational view, taken at the left end of Fig. 1, but only of the shaft end-plate;

Fig. 5 is a vertical sectional view, substantially axially of the condenser shaft in Fig. 1, and medially of the plate shown in Fig. 4, showing in detail the manner in which the shaft is assembled;

Fig. 6 is a vertical sectional view, on the line 6—6 of Fig. 2;

Fig. 7 is a side elevational view, illustrating a system for remote control of a condenser, the apparatus being broken away in section to illustrate the construction thereof;

Fig. 8 is a detail vew, taken from the right-hand end of Fig. 7, part of the casing being broken away to illustrate a portion of the construction thereof; and Fig. 9 is a diagrammatic view, illustrating a method of dial drive directly from the reducing drive mechanism.

In the apparatus shown in Fig. 1, appears a condenser 10 of customary construction, having stator plates 12 and rotor plates 14. The rotor plates are mounted upon a shaft 16 in any well-known manner, the shaft being carried between end plates 18 and 20 in any desired manner, one such manner being hereinafter described. At one end 22 of the shaft, as, for instance, that end associated with plate 20, is a reduction drive 24, which includes an operating knob 26.

In the type of drive 24, here shown, there is included an annular gear 28 which may be mounted upon or made a part of a disk 30. For simplicity of construction it is desirable to make gear 28 and disk 30 as a single element as, for instance, by die-casting. Disk 30 is provided with suitable means so that it and its associated gear 28 may be mounted upon shaft end 22. In this case, the mounting means takes the form of an opening 32, non-circular in contouring, and formed centrally of disk 30. Shaft end 22 may be shouldered or otherwise given a cross-section at its extreme end so that the shaft end may be inserted into and fit snugly and tightly in the opening. A shoulder 34 may thus be provided on the shaft to limit movement of the disk. If desired, the shaft end may be swaged or otherwise the disk or the shaft end may be operated upon tightly to unite disk and shaft end for movement together.

Opposed to gear 28 is another annular gear 36, here shown as a part of manipulator 38. Annular gear 36 may be supported with the manipulator in any desired manner, as, for instance, by being secured to or being made a part of wall 40 of the manipulator. This likewise may simply be accomplished by making the manipulator and gear 36 in the same manner indicated for gear 28 and disk 30.

Arranged in association with end plate 20 is an escutcheon plate 42. To permit this association, plates to serve as end plates are each provided with an opening 44 large enough to receive snugly the annular flange 46. This flange extends from the escutcheon to define shoulder 48, the face of which is brought into abutment with the face of plate 20. Suitable means for retaining the plate in an associated relation may be provided. For instance, in the rim portion 50 of the plate may be provided openings 52 for the reception of securing devices 54 such as screws for anchoring plate 42 to plate 20.

Escutcheon plate 42 may include an inwardly turned annular flange 56. Manipulator 38, on the other hand, in that portion directed away from wall 40, may have a shouldered portion 58. This shouldered portion is of such diameter as to be received snugly through opening 60 defined by flange 56. End face 62 is brought into abutment with the inner face of flange 56 and, together with other elements of the apparatus to be described, serves to locate, in this embodiment, the plates of the rotor with relation to the plates of the stator. The annular edge of flange 56 thus provides a bearing for the manipulator, and also restrains the manipulator against outward movement.

Plates, such as those described to serve for end plate 20, may, merely by turning them over, serve for end plate 18. In such event, opening 44 may be straddled by a resilient strap 64, retained by suitable securing means, such as the screws 66. Strap 64 may have formed therein a depression 68 for the reception of a ball 70 which then cooperates with a like recess 72 in the end of shaft 16, thus providing a ball thrust bearing for the shaft in cooperation with the resiliency of strap 64. However, in most instances, a separate plate in which there is formed an opening smaller than opening 44 will serve as plate 18. The same plate will function for plate 20, in any event, whether it is intended that rotor plates 14 rotate clockwise or counterclockwise. This result is derived from the fact that but the one opening 44 is requisite for a proper mounting of the drive. By a mere reversal of the face of such an end plate, the axial position of opening 44 is adjusted for the required type of drive.

As shown in Fig. 2, disk 30 and wall 40 may be of such extent as to be in actual contact, one with the other. Their frictional contact, as can readily be understood, will be effective to counteract the customary effects of backlash in gears. At the same time, to reduce the frictional component, face 74 may be cut away, as at 76, to free it of contact with wall 40 and also gear member 78. The association of the faces of disk 30 and wall 40 is such as to define a chamber 80 between them, within which gear member 78 is contained and movable.

Gear member 78 may be made in any desired manner as, for instance, by die-casting. It is also possible to fabricate it from a plurality of distinct members, retained together. Gear member 78 is formed to define a pair of gears 82 and 84. When assembled as shown, gear 82 engages annular gear 28, and gear 84 engages annular gear 36.

Manipulator 38 may include a hub 86, to provide a bearing for a spindle 88. The spindle extends through the hub to a position immediately in association with gear member 78, where eccentric 90 is defined. A recess 92 in manipulator 38 may, with the formation of the spindle and of the eccentric, define a race for balls 94, thus again making provision for an accurate positioning of the shaft in relation to its several associated parts.

Gear member 78 is formed centrally thereof with a circular bearing opening 96 within which the eccentric is received. A pin 98, arranged to be coaxial with spindle 88, extends beyond eccentric 90 to be received in a bore 100 in shaft end 22. A ball 102 in the bore may provide a suitable end thrust bearing for the spindle. In this manner, the spindle is mounted in bearings, its ends being carried in hub 86 and shaft 16.

Spindle 88 may extend forwardly beyond hub 86, there to have mounted thereon operating knob 26. Suitable means may be provided for permitting assembly and removal of the knob at will. In this case, a set-screw 104 is shown engaged through the knob and against the shaft end. In turn, a cylindrical extension 106 from the manipulator may provide for the reception of an actuating ring 108, likewise removably secured to the extension by any suitable means, in this case, set-screw 110. Inner face 112 of ring 108 may be brought up closely to the outer face of flange 56. A groove 114 may be provided in that face, within which may be disposed a spring 116, preferably of the leaf variety. This spring will then direct its force against flange 56, resisting relative movement of the manipulator with relation to the escutcheon plate.

As shown in Fig. 3, annular gears 28 and 36, of different diameters, are substantially coaxial. The diameters of gears 82 and 84 are such that, when member 78 is assembled upon eccentric 90, these gears will be tangent to, and, therefore, their teeth will be in mesh with the teeth of, their respective annular gears. On rotation of spindle 88, eccentric 90 will, therefore, cause gear member 78 to rotate eccentrically within the housing between the annular gears. However, throughout the movement of the eccentric, the gears will remain constantly in mesh.

Owing to the eccentricity, gears 82 and 84 may not be of the same diameter as their respective annular gears. As the eccentricity decreases, this condition naturally would be approached. As appears further herein, with such decrease of eccentricity, the degree of reduction is increased. Therefore, if a greater degree of reduction is desired, operating with the same annular gears, it is necessary merely to provide a smaller eccentric and a different gear member 78.

If it be desired to operate a dial in conjunction with the construction shown in Fig. 2, many different methods may be followed. One suggested by the specific construction herein set forth involves making portion 118 of escutcheon plate 42 long enough to permit the formation of a slot 120 therethrough. This slot is made slightly greater in extent than 180°. A prong 122 may be applied to, or be made a part of, disk 30, this prong being passed through slot 120 to extend externally of the housing formed by the escutcheon plate. An annular plate 124, carrying proper indicia, is then secured to the extending end of prong 122 in any desired manner. A guideway 126 may be formed on the opposed section 128 of portion 118. The freely hanging plate is restrained against movement other than rotational by the cooperation of the guide therewith.

Since, in certain assemblages, the actuating ring 108 and knob 26 would extend beyond the panel 130 of a cabinet (here shown dotted to represent a relative position), the dial produced by plate 124 would be behind the panel, and might cooperate with an opening 132 through the panel for a proper reading of the position of the stator plates. Prong 122, in making contact with the ends of slot 120, would thereby limit the movement not only of the dial, but also of the rotor, eliminating the necessity for stops upon the plates themselves, or upon the shaft, as in many present-day constructions.

Whichever of the actuating elements, that is, actuating ring 108 or knob 26, is propelled, the dial will at all times indicate positively the actual position of plates 14. By grasping actuating ring 108 and imparting to it sufficient force to overcome the frictional resistance of spring 116, the gear train between gear 36, gear member 78 and gear 28 will be locked, and the entire assembly, including shaft 16, rotated, thus making it possible to obtain a rough adjustment when such is desired. When an approximate position has thus been attained, as indicated by dial plate 124, actuating ring 108 is released, and knob 26 actuated, effecting the micrometer adjustment sought in such apparatus to obtain an exact positioning of the rotor plates.

To assemble the construction shown in Fig. 2, after strap 64 has been applied to its end plate 18, and the shaft end and its ball properly associated with the ball-receiving depression 68, the drive is assembled. Previously, however, manipulator 38, without its ring 108, has been assembled in escutcheon plate 42 by passing cylindrical extension 106 through opening 60. Then ring 108 is slipped over extension 106, and fixed in position, spring 116 being simultaneously located in its groove and against the flange face. Spindle 88 is dropped through the bore of hub 86, the balls are positioned in race 92, and knob 26 assembled in position. Gear member 78 is now slipped over the spindle, dropping into simultaneous cooperation with the eccentric and annular gear 28.

Now, since disk 30 and gear 28 have been assembled at the end of shaft 16, the next operation is to bring pin 98 into bore 100, after the ball has been inserted therein, and to secure escutcheon plate 42 to end plate 20. The opposed faces of disk 30 and wall 50 will now cooperate, together with the thrust bearing at strap 64, to retain the rotor plates in a properly associated relation to the stator plates.

In the apparatus shown in Fig. 7, the problem involved is in connection with remote control, especially adapted for use in radio sets in automobiles, or for similar purposes. In the construction shown, a casing 134 may be mounted in any desirable position, as on a suitable panel such as an automobile dash-board. This casing may include a base plate 136 and a cover plate 138, retained together by suitable means, such as screws 140. Carried in a bearing 142 in plate 136, and a bearing 144, in the hub 146 of annular gear 148, is a shaft 150. Intermediately of the shaft is provided an eccentric 152. The shaft extends beyond hub 146 and plate 138 for the reception of a knob 154.

The shaft also extends beyond plate 136 to provide means for engaging a coupling 156 of a cable 158. This cable extends to and is, in turn, coupled, at 160, to a spindle 162, which is supported in a bearing 164 in a cover plate 166. Plate 166 has a shoulder formation 168 for reception in an opening 170 in end plate 172 of a condenser assembly 174.

At casing 134, eccentric 152 supports gear member 176, composed of the united gears 178 and 180, functioning to rotate them eccentrically while in engagement, respectively, with annular gears 182 and 148. Annular gear 182, in this case, is shown as formed as a part of base plate 136; and annular gear 148, as a part of a member 184. Hub 146 on member 184 is, in turn, provided with a bearing at an opening 186 through cover plate 138.

Associated with member 184, as by being secured to the outer face 188 thereof, is a dial member 190. A portion of member 190 is made visible through an opening 192 in cover plate 138, this opening being protected by a suitable transparent window 194 to permit reading of the dial therethrough.

At spindle 162 there is provided an eccentric 196 substantially similar to eccentric 90, and carrying a gear member 198 consisting of gears 200 and 202. These gears are intermeshed with annular gears 204 and 206, annular gear 204 being formed integrally with cover plate 166, while annular gear 206 is formed as a part of a disk 208, secured to shaft 210 of the condenser assembly. Spindle end 212 is carried in a recess 214 in the shaft end. As appears in Fig. 1, the total extent of the elements involved in the reduction drive, that is, the diameter of the largest element thereof, is hardly as large as the space required for a proper movement of the rotor plates of the condenser.

It can, therefore, be seen that, by introducing into the assembly, at casing 134, substantially the same relationship of gears and eccentric as in the assembly at gears 204 and 206, the dial reading through opening 192 will be substantially continuously identical with the positioning of the plates at condenser assembly 174. However, in order to produce a micrometer reading of even higher degree for the condenser, and taking into account the fact that most condenser rotors are stopped against rotation beyond 180°, the ratio of reduction may be such that dial member 190 will rotate 360° for every 180° of shaft 210.

In order to eliminate the necessity for stops upon the rotor of the condenser, with an arrangement of the character just set forth, a pin 216 may be mounted in plate 136 so as to engage with a pin 218 extending radially and mounted in any desired manner on member 184. Thus, knob 154 will be stopped against a rotation of more than 360° in one direction, while the condenser coupled to it is likewise restrained against a rotation of more than 180°.

In the construction shown in Figs. 2 and 3, it will be seen that the effective diameter of annular gear 28 is smaller than the diameter of annular gear 36. There results, from an arrangement of this character, that movement of knob 26 in one direction will effect movement of shaft 16 in the same direction. In Fig. 7, the reverse condition is shown, where the effective diameter of annular gear 204 is less than that of gear 206. The same type of reduction will ensue, except that the rotation of knob 154 will be reversely of the rotation of shaft 210.

In Fig. 9, is shown a construction for driving a dial not concentrically disposed with relation to the condenser shaft. In this case, member 220, which has as a part thereof the annular gear directly coupled to the condenser shaft, may be provided with external teeth 222. With these teeth are then engaged a spur gear 224, carried by a shaft 226. On shaft 226, or, as desired, upon a still more remotely disposed member, is a dial 228, positioned thus in accordance with the position of the rotor plates. Teeth 222 may be formed as a part of the die-casting operation indicated for the production of member 220.

It has been found that apparatus of the type herein discussed responds to the following formula:

$$\frac{CE-BD}{CE}$$

where
B = number of teeth in the fixed annular gear;
C = number of teeth in the eccentric gear meshing with the fixed annular gear;
D = number of teeth in the eccentric gear meshing with the annular gear fixed to the rotor;
E = number of teeth in the annular gear fixed to the rotor.

Furthermore, this apparatus responds to a formula of the following character:

$$\frac{2X(B-E)}{(B-2X)E}$$

where
X = eccentricity.

From this formula, it is clearly understandable that, as the eccentricity decreases, the degree of reduction increases. Also, it is seen that the size of the annular gear fixed to the rotor becomes an important element, as, with increase of its diameter, the reduction factor increases until a point where the two annular gears are of the same diameter when no relative movement of the annular gears may occur.

Many other changes could be effected in the particular apparatus designed, and in the methods of operation set forth, and in the specific details thereof, without substantially departing from the invention intended to be defined in the claims, the specific description herein being merely to illustrate operative embodiments for carrying out the spirit of the invention.

What is claimed as new and useful is:

1. A reduction drive for variable radio-tuning apparatus including a substantially stationary portion, a portion movable relatively to the stationary portion, and a shaft for the movable portion of the tuning apparatus; said drive including a pair of manipulators, and means interconnecting the manipulators and the shaft; the interconnecting means comprising elements including a gear and an annular gear which move relatively to each other when one of the manipulators is the force-transmitting agent but lock against movement relative to each other when force is applied to the other manipulator; said other manipulator normally providing means for retaining one of the elements stationary with relation to the stationary portion.

2. A reduction drive for variable radio-tuning apparatus including a substantially stationary portion, a portion movable relatively to the stationary portion, and a shaft for the movable portion of the tuning apparatus; said drive including a pair of manipulators, and means interconnecting the manipulators and the shaft; the interconnecting means comprising elements including a gear and an annular gear which move relatively to each other when one of the manipulators is the force-transmitting agent but lock against movement relative to each other when force is applied to the other manipulator; said other manipulator being fixedly engaged with and normally providing means for retaining one of the elements stationary with relation to the stationary portion.

3. A reduction drive for variable radio-tuning apparatus including a substantially stationary portion, a portion movable relatively to the stationary portion, and a shaft for the movable portion of the tuning apparatus; said drive including a pair of manipulators, and means interconnecting the manipulators and the shaft; the interconnecting means comprising elements including a gear and an annular gear which move relatively to each other when one of the manipulators is the force-transmitting agent but lock against movement relative to each other when force is applied to the other manipulator; said other manipulator being fixedly engaged with one of the elements; and means co-operating with said other manipulator normally to provide means for retaining said other manipulator and said element stationary with relation to the stationary portion.

4. In a precision adjustment device, the combination of an instrument mounting having mounted thereon a rotary part to be angularly adjusted, a knob and a manipulator for controlling the angular adjustment of the rotary part, a plurality of elements between the knob and the manipulator, and between them and the rotary part, for transmitting motion from the knob and the manipulator to the rotary part, and means on one of the elements and the instrument mounting for limiting in its angular movement the rotary part with relation to the instrument mounting under the action of either the manipulator or the knob.

5. In a precision adjustment device, the combination of an instrument mounting having mounted thereon a rotary part to be angularly adjusted, a knob and a manipulator for controlling the angular adjustment of the rotary part, a plurality of elements between the knob and the manipulator, and between them and the rotary part, for transmitting motion from the knob and the manipulator to the rotary part, one of the elements being fixedly associated with the rotary part, and means on that element and the instrument mounting for limiting the angular movement of the rotary part with relation to the instrument mounting.

6. In a precision adjustment device, the combination of an instrument mounting having mounted thereon a rotary part to be angularly adjusted, a knob and a manipulator for controlling the angular adjustment of the rotary part, a plurality of elements between the knob and the manipulator, and between them and the rotary part, for transmission motion from the knob and the manipulator to the rotary part, one of the elements being fixedly associated with the rotary part, means for indicating the angular position of the rotary part, the indicating means being directly controlled by that element, and means on that element and the instrument mounting for limiting the angular movement of the rotary part with relation to the instrument mounting.

7. In a precision adjustment device, the combination of an instrument mounting having mounted thereon a rotary part to be angularly adjusted, a knob and a manipulator for controlling the angular adjustment of the rotary part, a plurality of elements between the knob and the manipulator, and between them and the rotary part, for transmitting motion from the knob and the manipulator to the rotary part, one of the elements being fixedly associated with the rotary part, means for indicating the angular position of the rotary part, the indicating means being carried directly on that element, and means on that element and the instrument mounting for limiting the angular movement of the rotary part with relation to the instrument mounting.

8. In a precision adjustment device, the combination of an instrument mounting having mounted thereon a rotary part to be angularly adjusted, a knob and a manipulator for controlling the angular adjustment of the rotary part, a plurality of elements between the knob and the manipulator, and between them and the rotary part, for transmiting motion from the knob and the manipulator to the rotary part, one of the elements being associated with the rotary part to have the same angular movement as the rotary part, means for indicating the angular position of the rotary part, the indicating means being directly controlled by that element, and means on that element and the instrument mounting for limiting the angular movement of the rotary part with relation to the instrument mounting.

9. In a precision adjustment device, the combination of an instrument mounting having mounted thereon a rotary part to be angularly adjusted, a knob and a manipulator for controlling the angular adjustment of the rotary part, a plurality of elements between the knob and the manipulator, and between them and the rotary part, for transmitting motion from the knob and the manipulator to the rotary part, one of the elements being associated with the rotary part to have the same angular movement as the rotary part, means for indicating the angular position of the rotary part, the indicating means being carried directly on that element, and means on that element and the instrument mounting for limiting the angular movement of the rotary part with relation to the instrument mounting.

10. In a precision adjustment device, the combination of an instrument mounting having mounted thereon a rotary part to be angularly adjusted, a knob and a manipulator for controlling the angular adjustment of the rotary part, a pair of annular gears positioned substantially coaxially, spur gear means within the annular gears for engaging both annular gears simultaneously, the knob having means for carrying the spur gear means and for rolling the spur gear means simultaneously over both the annular gears, the manipulator being carried on one of the annular gears, means between the manipulator and the instrument mounting for restraining movement of the annular gear carrying the manipulator when the knob is rotated, and means on one of the elements and the instrument mounting for limiting the angular movement of the rotary part with relation to the instrument mounting.

11. In a precision adjustment device, the combination of an instrument mounting having mounted thereon a rotary part to be angularly adjusted, a knob and a manipulator for controlling the angular adjustment of the rotary part, a pair of annular gears positioned substantially coaxially, spur gear means within the annular gears for engaging both annular gears simultaneously, the knob having means for carrying the spur gear means and for rolling the spur gear means simultaneously over both the annular gears, the manipulator being carried on one of the annular gears, and means between the manipulator and the instrument mounting for restraining movement of the annular gear carrying the manipulator when the knob is rotated.

12. In a precision adjustment device, the combination of an instrument mounting having mounted thereon a rotary part to be angularly adjusted, a knob and a manipulator for controlling the angular adjustment of the rotary part, a pair of annular gears positioned substantially coaxially, spur gear means within the annular gears for engaging both annular gears simultaneously, the instrument mounting having a housing for the annular gears, the knob having means for carrying the spur gear means and for rolling the spur gear means simultaneously over both the annular gears, the manipulator being carried on one of the annular gears, and means between the manipulator and the housing for restraining movement of the annular gear carrying the manipulator when the knob is rotated.

13. In a precision adjustment device, the combination of an instrument mounting having mounted thereon a rotary part to be angularly adjusted, a knob and a manipulator for controlling the angular adjustment of the rotary part, a pair of annular gears positioned substantially coaxially, spur gear means within the annular gears for engaging both annular gears simultaneously, the instrument mounting having a housing for the annular gears, the knob having means for carrying the spur gear means and for rolling the spur gear means simultaneously over both the annular gears, one of the annular gears having a portion extending through the housing, the manipulator being carried on said portion, and means between the manipulator and the housing for restraining movement of the annular gear carrying the manipulator when the knob is rotated.

14. In a precision adjustment device, the combination of an instrument mounting having mounted thereon a rotary part to be angularly adjusted, a knob and a manipulator for controlling the angular adjustment of the rotary part, a pair of annular gears positioned substantially coaxially, spur gear means within the annular gears for engaging both annular gears simultaneously, the instrument mounting having a housing for the annular gears, the knob having means for carrying the spur gear means and for rolling the spur gear means simultaneously over both the annular gears, one of the annular gears having a portion extending through and journalled in the housing, the manipulator being carried on said portion, and means between the manipulator and the housing for restraining movement of the annular gear carrying the manipulator when the knob is rotated.

15. In a precision adjustment device, the combination of an instrument mounting having mounted thereon a rotary part to be angularly adjusted, a knob and a manipulator for controlling the angular adjustment of the rotary part, a pair of annular gears positioned substantially coaxially, spur gear means within the annular gears for engaging both annular gears simultaneously, the instrument mounting having a housing for the annular gears, the knob having means for carrying the spur gear means and for rolling the spur gear means simultaneously over both the annular gears, one of the annular gears having a portion extending through the housing, the manipulator being carried on said portion, and means between the manipulator and the housing and engaging the outer face of the housing for restraining movement of the annular gear carrying the manipulator when the knob is rotated.

16. In a precision adjustment device, the combination of an instrument mounting having mounted thereon a rotary part to be angularly adjusted, a knob and a manipulator for controlling the angular adjustment of the rotary part, a pair of annular gears positioned substantially coaxially, spur gear means within the annular gears for engaging both annular gears simultaneously, the instrument mounting having a housing for the annular gears, one of the annular gears having a portion extending through the housing, the manipulator being carried on said portion, an eccentric having the spur gear means journalled therein so that on rotation of the eccentric the spur gear means will be rolled simultaneously over both annular gears, a shaft extending from the eccentric and through that annular gear, the knob being carried by the shaft, and means between the manipulator and the housing and engaging the outer face of the housing for restraining movement of the annular gear carrying the manipulator when the knob is rotated.

17. In a precision adjustment device, the combination of an instrument mounting having mounted thereon a rotary part to be angularly adjusted, a knob and a manipulator for controlling the angular adjustment of the rotary part, a pair of annular gears positioned substantially coaxially, spur gear means within the annular gears for engaging both annular gears simultaneously, the knob having means for carrying the spur gear means and for rolling the spur gear means simultaneously over both the annular gears, the manipulator being fixedly associated with one of the annular gears to rotate therewith, and means for restraining the annular gear having the manipulator associated therewith against movement when the knob is rotated.

VALENTIN PETERSEN.

CERTIFICATE OF CORRECTION.

Patent No. 2,167,677.                        August 1, 1939.

VALENTIN PETERSEN.

It is hereby certified that error appears in the printed specification of the above numbered patent requiring correction as follows: Page 1, first column, line 23, after the word "trend" strike out the comma; page 5, second column, line 52, claim 6, for "transmission" read transmitting; page 6, first column, line 10, claim 8, for "transmiting" read transmitting; and that the said Letters Patent should be read with this correction therein that the same may conform to the record of the case in the Patent Office.

Signed and sealed this 6th day of February, A. D. 1940.

(Seal)                                         Henry Van Arsdale,
                                            Acting Commissioner of Patents.

bination of an instrument mounting having mounted thereon a rotary part to be angularly adjusted, a knob and a manipulator for controlling the angular adjustment of the rotary part, a pair of annular gears positioned substantially coaxially, spur gear means within the annular gears for engaging both annular gears simultaneously, the instrument mounting having a housing for the annular gears, one of the annular gears having a portion extending through the housing, the manipulator being carried on said portion, an eccentric having the spur gear means journalled therein so that on rotation of the eccentric the spur gear means will be rolled simultaneously over both annular gears, a shaft extending from the eccentric and through that annular gear, the knob being carried by the shaft, and means between the manipulator and the housing and engaging the outer face of the housing for restraining movement of the annular gear carrying the manipulator when the knob is rotated.

17. In a precision adjustment device, the combination of an instrument mounting having mounted thereon a rotary part to be angularly adjusted, a knob and a manipulator for controlling the angular adjustment of the rotary part, a pair of annular gears positioned substantially coaxially, spur gear means within the annular gears for engaging both annular gears simultaneously, the knob having means for carrying the spur gear means and for rolling the spur gear means simultaneously over both the annular gears, the manipulator being fixedly associated with one of the annular gears to rotate therewith, and means for restraining the annular gear having the manipulator associated therewith against movement when the knob is rotated.

VALENTIN PETERSEN.

CERTIFICATE OF CORRECTION.

Patent No. 2,167,677.                                  August 1, 1939.

VALENTIN PETERSEN.

It is hereby certified that error appears in the printed specification of the above numbered patent requiring correction as follows: Page 1, first column, line 23, after the word "trend" strike out the comma; page 5, second column, line 52, claim 6, for "transmission" read transmitting; page 6, first column, line 10, claim 8, for "transmiting" read transmitting; and that the said Letters Patent should be read with this correction therein that the same may conform to the record of the case in the Patent Office.

Signed and sealed this 6th day of February, A. D. 1940.

(Seal)
Henry Van Arsdale,
Acting Commissioner of Patents.